United States Patent [19] | [11] 4,037,059
Stine | [45] July 19, 1977

[54] INTERCOM SYSTEM FOR A KEY TELEPHONE SYSTEM

[75] Inventor: Robert David Stine, Etters, Pa.

[73] Assignee: International Telephone and Telegraph Corporation, Nutley, N.J.

[21] Appl. No.: 684,205

[22] Filed: May 7, 1976

[51] Int. Cl.[2] .......... H04M 9/00

[52] U.S. Cl. .......... 179/99; 179/84 SS; 179/18 AD

[58] Field of Search .......... 179/99, 18 BF, 18 AD, 179/1 H, 37–40, 84 SS, 18 HB

[56] References Cited

U.S. PATENT DOCUMENTS

| | | | |
|---|---|---|---|
| 3,267,219 | 8/1966 | Van Horn | 179/18 BF |
| 3,872,261 | 3/1975 | Shinoi et al. | 179/99 |
| 3,898,392 | 8/1975 | Jackson | 179/99 |
| 3,928,732 | 12/1975 | Simon et al. | 179/99 |
| 3,976,847 | 8/1976 | Bidlack et al. | 179/99 |

*Primary Examiner*—Kathleen H. Claffy
*Assistant Examiner*—Gerald L. Brigance
*Attorney, Agent, or Firm*—John T. O'Halloran; Alfred C. Hill

[57] ABSTRACT

A call selector circuit is coupled to all of a plurality of intercom stations and is responsive to a call initiating signal from one of the plurality of stations to provide a first portion of a connection to another of the plurality of stations. A call routing circuit is coupled to the selector circuit to establish a second portion of the connection. A diode matrix is coupled to the routing circuit to establish a third portion of the connection. A relay matrix is coupled to the diode matrix and all of the plurality of stations to complete the connection and enable a calling party in the vicinity of the one of the plurality of stations to page a called party in the vicinity of the another of the plurality of stations. In addition the call selector and the relay matrix cooperate to provide an "all page" mode of operation by establishing a connection between all of the plurality of stations to enable the calling party to page the called party at all of the plurality of stations.

8 Claims, 4 Drawing Figures

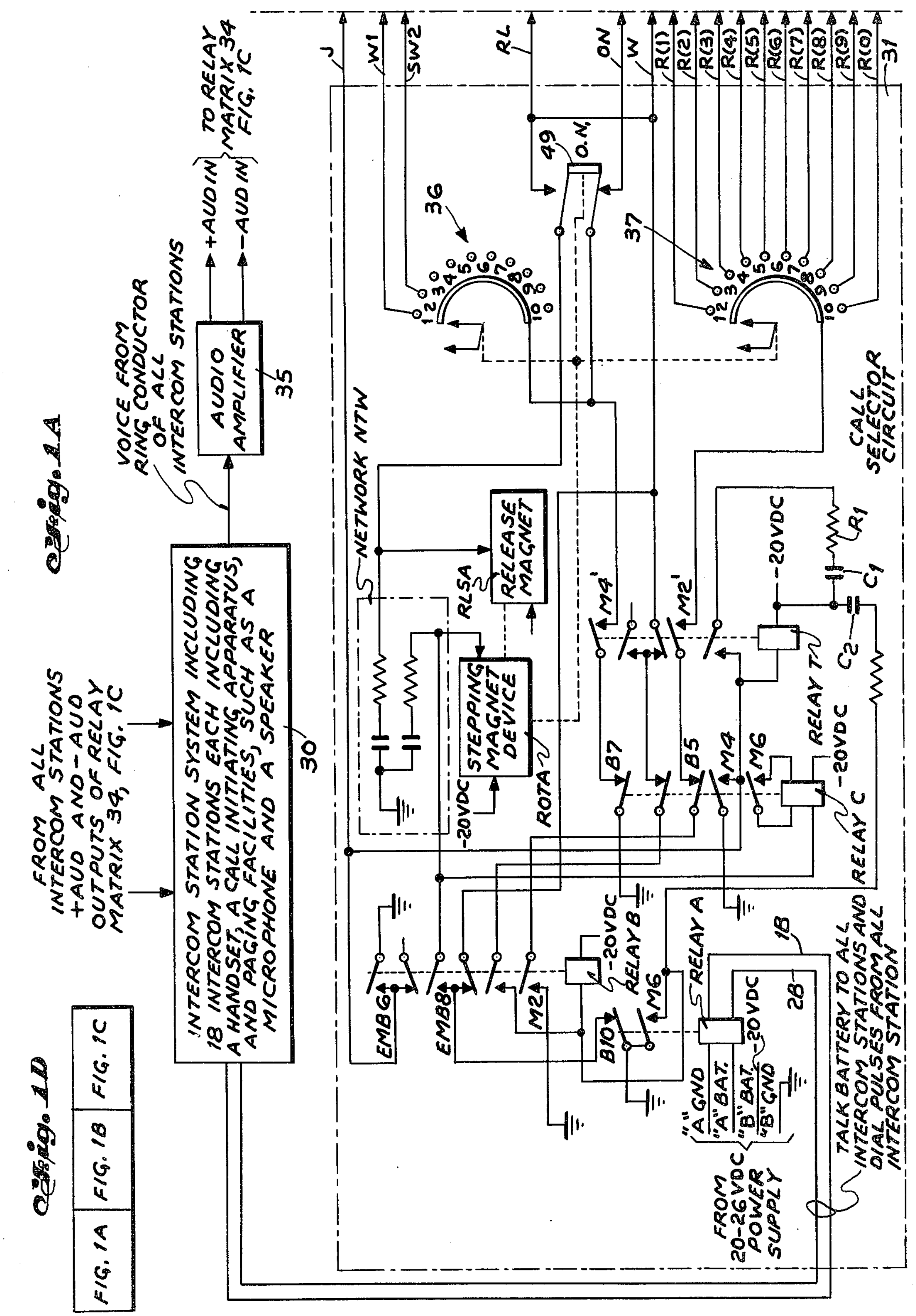
Fig. 1A
FIG. 1A
FIG. 1B
FIG. 1C
Fig. 1D
FROM ALL INTERCOM STATIONS +AUD AND -AUD OUTPUTS OF RELAY MATRIX 34, FIG. 1C
INTERCOM STATION SYSTEM INCLUDING 18 INTERCOM STATIONS EACH INCLUDING A HANDSET, A CALL INITIATING APPARATUS, AND PAGING FACILITIES, SUCH AS A MICROPHONE AND A SPEAKER
30
VOICE FROM RING CONDUCTOR OF ALL INTERCOM STATIONS
AUDIO AMPLIFIER
35
+AUD IN
-AUD IN
TO RELAY MATRIX 34 FIG. 1C
NETWORK NTW
RELEASE MAGNET
RLSA
STEPPING MAGNET DEVICE
ROTA
-20VDC
36
37
49
O.N.
J
W1
SW2
RL
ON
W
R(1)
R(2)
R(3)
R(4)
R(5)
R(6)
R(7)
R(8)
R(9)
R(0)
31
M4'
M2'
R1
C1
C2
RELAY T
B7
B5
M4
M6
RELAY C
EMBG
EMB8
M2
B10
RELAY B
RELAY A
1B
2B
"A" GND
"A" BAT.
"B" BAT.
"B" GND
FROM 20-26VDC POWER SUPPLY
TALK BATT TO ALL INTERCOM STATIONS AND DIAL PULSES FROM ALL INTERCOM STATION
CALL SELECTOR CIRCUIT

INTERCOM SYSTEM FOR A KEY TELEPHONE SYSTEM

BACKGROUND OF THE INVENTION

This invention relates to intercom systems and more particularly to an intercom system for a key telephone system.

The telephone industry presently offers a K1A2 key telephone system consisting of a basic pre-wired mounting package that is designated as a key service unit. It contains provisions to receive associated "plug-in" units in varying combinations to meet subscriber requirements.

One feature of this key system is a known rotary dial intercom unit. The intercom unit provides a single common talking path for all stations in the system. When a call is initiated, the system provides a steady busy lamp signal at all locations and causes a single burst or ringing signal at the called station only. If the called station does not answer, the calling station must re-dial the code of the called station in order to initiate a second ring burst at the called station. This requirement of re-dialing, of course, is a disadvantage.

A first alternative to overcome the disadvantage of the known intercom unit is set forth in my co-pending application (Case 1), Ser. No. 683877, filed May 6, 1976, in which a control circuit is provided including a mechanical interrupter which provides a plurality of interrupted ringing signal bursts when one of a plurality of intercom stations goes off-hook and first initiates a call to another of a plurality of intercom stations. The interrupter also provides an interrupted voltage to cause a button lamp at the another of the plurality of stations to flash. A call selector circuit and call routing circuit are coupled to the control circuit and the plurality of stations to provide a connection between the one and the another of the plurality of stations to enable the interrupted ringing signal bursts to be conducted on the connection to the another of the plurality of stations. Logic circuitry is coupled to the plurality of intercom stations and the control circuit to detect when the one and the another of the plurality of stations are both off-hook. When this condition is detected, the interrupted ringing signal bursts are stopped and the button lamp is caused to glow steadily.

SUMMARY OF THE INVENTION

An object of the present invention is to provide a second alternative for overcoming the above-mentioned disadvantage of the known prior art common path intercom unit for a key telephone system.

Another object of the present invention is to provide a selective paging intercom system for a key telephone system.

A feature of the present invention is the provision of an intercom system having a plurality of intercom stations comprising: first means coupled to the plurality of stations responsive to a call initiating signal from one of the plurality of stations to establish a connection between the one of the plurality of stations to another of the plurality of stations, the call initiating signal being a code identifying the another of the plurality of stations; and second means coupled to the plurality of stations and the first means to enable a calling party in the vicinity of the one of the stations to page a called party in the vicinity of the another of the stations through the connection.

Another feature of the present invention is the provision of the above-mentioned first means being responsive to a predetermined code of the call initiate signal to connect all of the plurality of stations together to enable the calling party to page the called party at all of the plurality of stations.

BRIEF DESCRIPTION OF THE DRAWING

Above-mentioned and other features and objects of this invention will become more apparent by reference to the following description taken in conjunction with the accompanying drawing, in which:

FIGS. 1A - 1C, when organized as illustrated in FIG. 1D, is a schematic diagram, partially in block form, of the intercom system in accordance with the principles of the present invention.

DESCRIPTION OF THE PREFERRED EMBODIMENT

The intercom system described hereinbelow will operate under control of a call initiating apparatus, such as a dial or push buttons with their associated circuitry, to generate a call initiating signal. To facilitate the description of the intercom system of the present invention, the call initiating apparatus will be considered as a dial and the call initiating signal will be dial pulses. However, the intercom system will operate as well with push button call initiating apparatus.

Figure 1B:
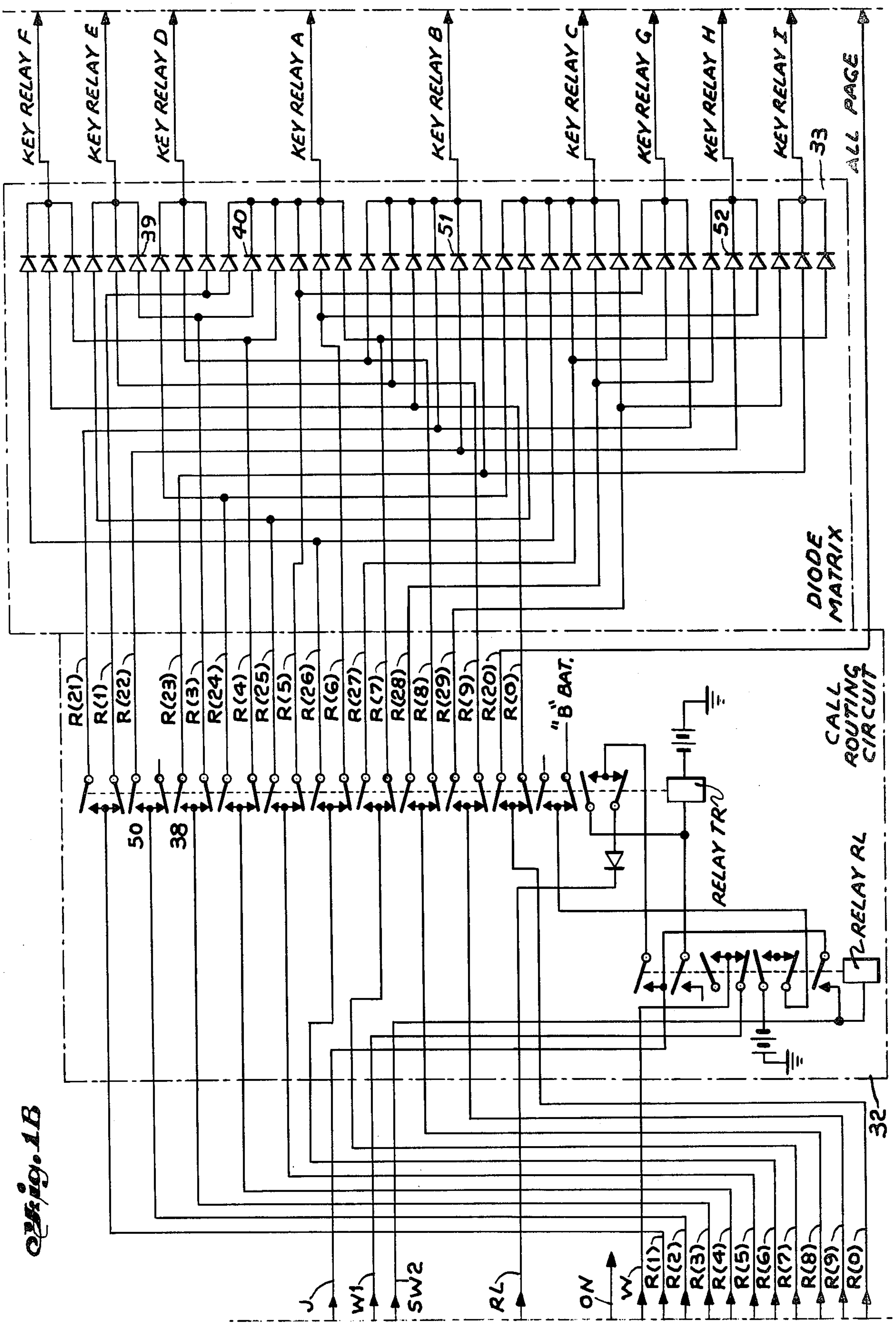
Figure 1C:
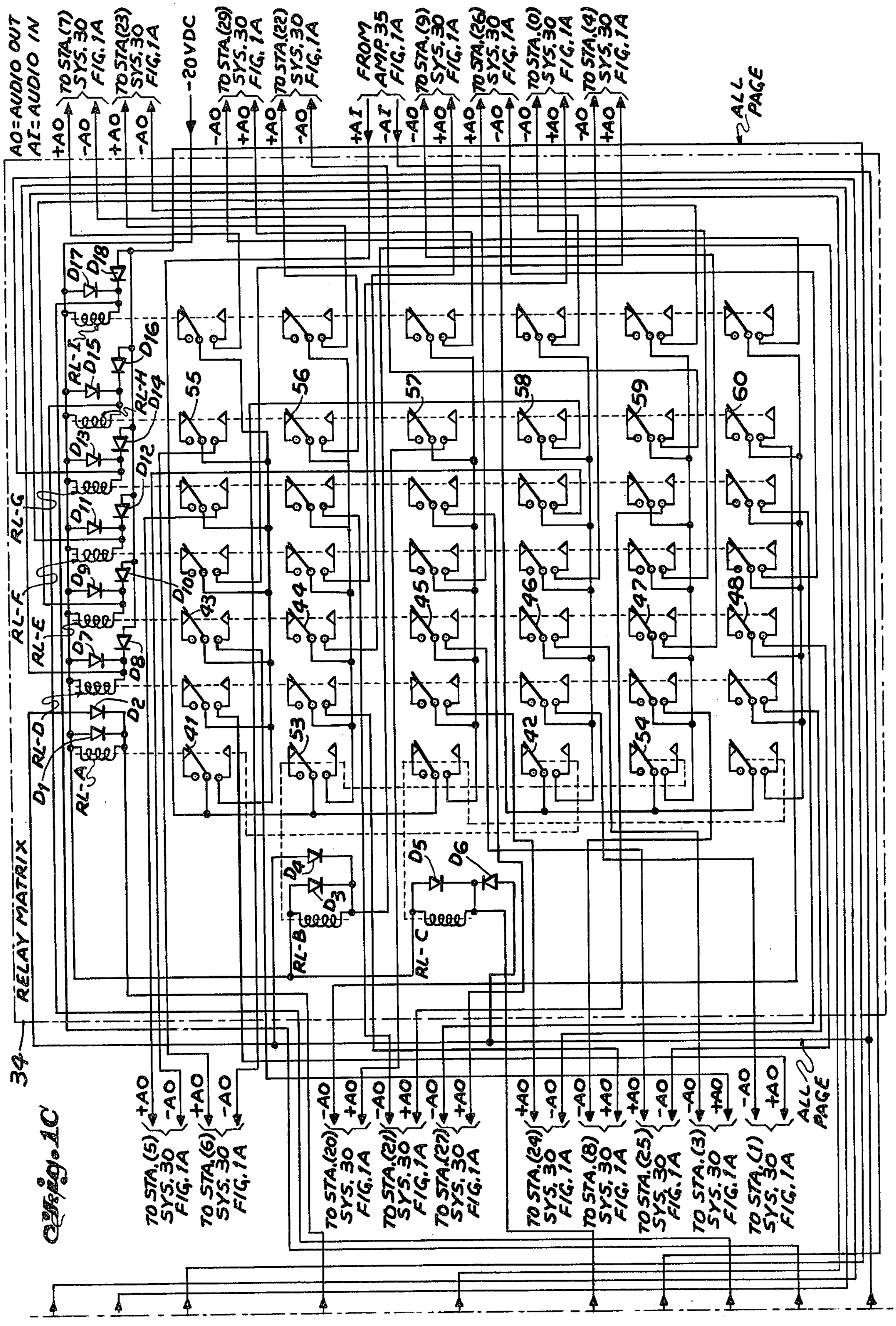

As illustrated in FIGS. 1A - 1C, when organized as illustrated in FIG. 1D, the intercom system of the present invention includes an intercom station system 30 including 18 intercom systems, each including a handset, a call initiating apparatus and paging facilities such as a microphone and a speaker, a call selector circuit 31, a call routing circuit 32, a diode matrix 33, a relay matrix 34 and an audio amplifier 35 which is coupled between the ring conductors of all the intercom stations of system 30 and the audio input (page input) of relay matrix 34.

Call selector circuit 31 is substantially identical with call selector circuit 36 of the above-cited co-pending application, with the exception that ground potential is coupled to contact M2 of relay B rather than the interrupted ringing signal bursts of the above-cited co-pending application. Call routing circuit 32 is identical to call routing circuit 37 of the above-cited co-pending application. Diode matrix 33 includes 36 diodes. The 18 conductors labeled with numbers, such as R(21), where the number in the parentheses is the code of the dialed station, provides the inputs to matrix 33. The nine output terminals, such as "key relay F", represent the outputs of the diode matrix 33 and also indicate the relay to be activated in the relay matrix 34.

The relay matrix contains nine six-pole relays RL-A through RL-I, which provide a total of 18 individual station selections and an "all page" mode or selection where all stations are interconnected. The "all page" mode of operation is activated by dialing a selected code, such as (20) as illustrated for example herein. Diodes D1, D3, D5, D7, D9, D11, D13, D15 and D17 in shunt relation with each relay coil is for protection of the relay coil. Diodes D2, D4, D6, D8, D10, D12, D14, D16 and D18 are in series with each coil to provide an "all page" capability.

Audio amplifier 35 is coupled to the ring conductor of all intercom stations of system 30 and to the +AI (+ page) and −AI (− page) inputs of relay matrix 34 and the audio signal (page) present at these inputs are routed through relay matrix 34 upon proper selection of the relays by the outputs of diode matrix 33.

The talk battery (the "A" battery) is fed to all stations of system 30 via relay A and conductors 2B and 1B. When a station goes off-hook to initiate a call, the talk battery is placed on the tip and ring conductors of the intercom phone. When dialing a called station, the dialing pulses pulse the battery fed relay A. This steps the mechanically actuated wipers of selector switch banks 36 and 37 by pulsing the stepping magnet device ROTA via contacts EMB8 of relay B and contact B10 of relay A. When the called station answers, in other words, goes off-hook, and the connection has been completed, selector switch banks 36 and 37 are permitted to home by de-energizing relay T and energizing release magnet RLSA.

During the establishment of the connection, relay T remains activated by the ground applied from contact EMB6 of relay B. The above connection prohibits the stepping switch from homing, that is, returning to its initial or normal position, thereby holding the connection to allow the ground on contact M2 of relay B to be connected through call routing circuit 32, diode matrix 33 and, hence, to the keying inputs of relay matrix 34.

For line seizure, a call is initiated by lifting the telephone handset of the calling intercom station and pressing a line pick-up button associated with an idle intercom line. This operation provides a circuit to operate relay A through the tip and ring conductors of the telephone handset. The relay A in operating, operates relay B through contact M6. Energizing relays A and B prepare a pulsing circuit for stepping magnet device ROTA. This pulsing circuit is established through contact 10B of relay A and contact EBM8 of relay B.

The stepping magnet device ROTA includes a rotating magnet to rotate a toothed disc which is held in each stepped position by a lever engaging a tooth of the disc. The disc is connected to the wipers of selector switch banks 36 and 37 with the wiper making a connection to the output terminals thereof. To assist switch banks 36 and 37 to come to a "home" position, release magnet RLSA lifts the lever from the engaged tooth in the disc of stepping magnet device ROTA leaving the wipers of selector switch banks 36 and 37 to return to their normal or home position.

Network NTW in circuit 31 coupled to device ROTA and magnet RLSA is used for suppression of spiking.

Station selection may be provided by dialing a single digit station code. As the digit is dialed, the circuit through relay A is intermittently opened and closed, causing relay A to release and reoperate in unison with the dial pulses. The slow releasing relay B remains operated during pulsing. As relay A pulses, ground is connected under control of relay B to the rotary magnet of device ROTA, causing the wipers of selector switch banks 36 and 37 to step to a position corresponding to the digit dialed.

The slow releasing relay C operates on the first release of relay A and remains operated during the pulse train via contacts EBM8 of relay B and contact B10 of relay A. Relay C in operating, operates relay T through contact EMB6 of relay B, contact M4 of relay C, which in turn connects the resistor R1 and capacitor C1 across the winding of relay T. During pulsing, capacitor C1 charges through resistor R1.

When the series of dial pulses is completed, relay A reoperates and relay C releases. The relay C in releasing connects a ground signal to selector switch bank 36 via contact B7 of relay C and contact M4' of relay T. The ground potential on contact M2 of relay B is connected to selector switch bank 37 via contact M2 of relay B, contact B5 of relay C and contact M2' of relay T. One "R" lead of the plurality of "R" leads at the output of selector switch bank 37 is selected according to the single digit dialed enabling the ground potential to be coupled through the selected "R" lead to call routing circuit 32 and, hence, through the appropriate one of the normally closed contacts of relay TR to the appropriate single digit signal lead and from there to the selected input of diode matrix 33.

Assume that code (3) has been dialed. This will result due to the action of selector circuit 31 to place a ground potential on the output lead R(3) of selector switch bank 37. The ground potential on the R(3) output lead of selector switch bank 37 will be coupled to contacts 38 of relay TR and from there to diodes 39 and 40 of diode matrix 33. This results in ground potential being on the "key relay E" output lead and on the "key relay A" output lead. The ground potential on these two leads will be coupled to relay matrix 34 causing relay RL-A to activate and relay RL-E to actuate. The actuation of these two relays will move contacts 41 and 42 of relay RL-A to the position opposite that shown and contacts 43 - 48 of relay RL-E to the position opposite that illustrated. The operation of contacts 41 - 48 will provide a + audio signal (+ page) from amplifier 35 to be passed through contact 41 and, hence, through contacts 43 to the + audio output (+ page) lead for connection to station (3) of system 30 of FIG. 1A. The − audio input signal (− page) from amplifier 35 is coupled through contact 42 and, hence, to contact 46 for application to the − audio output (− page) lead for connection to station (3) of system 30 of FIG. 1. As a result, there is a connection between the intercom station of the calling station and the called station with the calling party at the calling station paging the called party in the vicinity of the called station.

Intercom stations associated with two-digit codes are selected by first dialing the ten's digit transfer code followed by the unit's digit. The numbers used for the ten's digit may not be used for the one-digit codes. As the transfer code is dialed, relays A, B, C and T and selector switch banks 36 and 37 operate as described previously. As soon as the series of dialed pulses is completed, relay C releases, contacting a ground potential to one of the associated transfer circuits operating relay RL under control of lead SW2, selector switch bank 36, contact M4' of relay T and contact B7 of relay C. When relay RL is operated, it locks under control of contact EMB6 of relay B via wire J. Relay RL connects an operating path to the release magnet RLSA under control of relays B and TR, lead RL and the off-normal contacts of switch 49 which has been moved to the position opposite to that shown by a cam surface on the toothed disc of device ROTA. This completes an operating path to relay TR under control of the off-normal contacts of switch 49 and the lead ON. The release of switch 49 will cause relay TR to actuate. When relay TR is actuated, it locks up under control of relays RL and B. The relay TR when operated transfers the "R" leads connected to selector switch bank 37 by removing the connection of the contacts of relay TR from the single digit code station leads and moving the contacts of relay TR to the position opposite to that shown, and, hence, to a group of two-digit code station leads. When the units digit is dialed and as soon as the series of dial pulses is completed, the ground potential is connected to diode matrix 33 and, hence, to a key relay input of relay matrix 34 to appropriately operate the relay to connect the audio input signal (page) from amplifier 35 through matrix 34 to the dialed station of system 30.

Assume that the dial code (22) is dialed by the calling party at the called station. As a result of the operation of circuit 31, the ground potential on contact M2 of relay B will be coupled to the output lead R(2) of selector switch bank 37 and, hence, to contact 50 of relay TR which is actuated and, hence, the contact 50 is in the position opposite to that illustrated so that the ground potential can be coupled on lead R(22) at the input of diode matrix 33 to diodes 51 and 52. This will provide a ground potential or a relay actuating signal on the "key relay B" lead and "key relay H" lead. The ground potential on these leads will actuate relay RL-B and RL-H. When relay RL-B actuates, contacts 53 and 54 will be moved to the position opposite to that shown. When relay RL-H is actuated, contacts 55 – 60 will be moved to the position opposite to that illustrated. As a result, the + audio input (+ page) from amplifier 35 will be coupled through contact 53 and contact 56 to the + audio output of station (22) of system 30. The − audio input (− page) from amplifier 37 will be coupled to contacts 54 and, hence, to contacts 59, which are coupled to the − audio output of station (22) of system 30. This results in the calling station of system 30 to be connected to the called station of system 30, such that the calling party can page the called party in the vicinity of station (22) of system 30.

In the "all page" mode of operation a predetermined code, code (20), illustrated herein for example, is dialed. The ground potential coupled to contact M2 of relay B is coupled to the R(20) lead of circuit 32 and, hence, to the "all page" inputs of relay matrix 34. This ground potential will actuate all of the relays RL-A to RL-I which in turn moves all of the contacts to the position opposite to that illustrated. The results in interconnecting all of the stations together and thereby having the page pass through relay matrix 34 to all of the intercom stations of system 30.

While I have described above the principles of my invention in connection with specific apparatus it is to be clearly understood that this description is made only by way of example and not as a limitation to the scope of my invention as set forth in the objects thereof and the accompanying claims.

I claim:

1. An intercom system having a plurality of intercom stations comprising:

first means coupled to said plurality of stations responsive to a call initiating signal from one of said plurality of stations to establish a connection between said one of said plurality of stations to another of said plurality of stations, said call initiating signal being a code identifying said another of said plurality of stations; and second means coupled to said plurality of stations and said first means to enable a calling party in the vicinity of said one of said stations to page a called party in the vicinity of said another of said stations through said connection;

said first means being responsive to a predetermined code of said call initiating signal to connect all of said plurality of stations together to enable said calling party to page said called party at all of said plurality of stations;

said first means including a call selector circuit coupled to said plurality of stations responsive to said call initiating signal to select a first output lead from a first plurality of output leads and to provide a plurality of control signals, said first output lead corresponding to said code of said another of said plurality of stations and establishing a first portion of said connection, a call routing circuit coupled to said call selector circuit responsive to said plurality of said control signals to connect said first output lead to a second output lead of a second plurality of output leads, said second output lead corresponding to said code of said another of said plurality of stations and establishing a second portion of said connection;

a diode matrix coupled to said call routing circuit to provide at least one relay activating signal corresponding to said code of said another of said plurality of stations and establishing a third portion of said connection; and a relay matrix coupled to said diode matrix and said second means, said relay matrix being responsive to said relay activating signal to complete said connection and to enable said calling party to page said called party.

2. A system according to claim 1, further including ground potential coupled to said call selector circuit to be coupled through said first output and said second output lead to said diode matrix to provide said relay activating signal.

3. A system according to claim 2, wherein said call selecting circuit includes a selector switch having said first plurality of output leads, a stepping magnet means coupled to said selector switch to step said selector switch to said first output lead, said stepping magnet means being controlled by said call initiating signal, and a release magnet coupled to said stepping magnet means and said call routing circuit to enable said selector switch to return to its initial position when said call is terminated.

4. A system according to claim 3, wherein said second means includes an audio amplifier coupled to a ring conductor of each of said plurality of stations and to said relay matrix.

5. An intercom system having a plurality of intercom stations comprising:

first means coupled to said plurality of stations responsive to a call initiating signal from one of said plurality of stations to establish a connection between said one of said plurality of stations to another of said plurality of stations, said call initiating signal being a code identifying said another of said plurality of stations; and second means coupled to said plurality of stations and said first means to enable a calling party in the vicinity of said one of said stations to page a called party in the vicinity of said another of said stations through said connection;

said first means including a call selector circuit coupled to said plurality of stations responsive to said call initiating signal to select a first output lead from a first plurality of output leads and to provide a plurality of control signals, said first output lead corresponding to said code of said another of said plurality of stations and establishing a first portion of said connection, a call routing circuit coupled to said call selector circuit responsive to said plurality of said control signals to connect said first output lead to a second output lead of a second plurality of output leads, said second output lead corresponding to said code of said another of said plurality of stations and establishing a second portion of said connection;

a diode matrix coupled to said call routing circuit to provide at least one relay activating signal corresponding to said code of said another of said plurality of stations and establishing a third portion of said connection; and a relay matrix coupled to said diode matrix and said second means, said relay matrix being responsive to said relay activating signal to complete said connection and to enable said calling party to page said called party.

6. A system according to claim 5, further including ground potential coupled to said call selector circuit to be coupled through said first output and said second output lead to said diode matrix to provide said relay activating signal.

7. A system according to claim 6, wherein said call selecting circuit includes a selector switch having said first plurality of output leads, a stepping magnet means coupled to said selector switch to step said selector switch to said first output lead, said stepping magnet means being controlled by said call initiating signal, and a release magnet coupled to said stepping magnet means and said call routing circuit to enable said selector switch to return to its initial position when said call is terminated.

8. A system according to claim 7, wherein said second means includes an audio amplifier coupled to a ring conductor of each of said plurality of stations and to said relay matrix.

* * * * *